(12) United States Patent
Qu

(10) Patent No.: US 11,780,385 B1
(45) Date of Patent: Oct. 10, 2023

(54) LICENSE PLATE HOLDER

(71) Applicant: Dezheng Qu, Shenzhen (CN)

(72) Inventor: Dezheng Qu, Shenzhen (CN)

( * ) Notice: Subject to any disclaimer, the term of this patent is extended or adjusted under 35 U.S.C. 154(b) by 0 days.

(21) Appl. No.: 18/125,657

(22) Filed: Mar. 23, 2023

(51) Int. Cl.
*G09F 7/18* (2006.01)
*B60R 13/10* (2006.01)

(52) U.S. Cl.
CPC .............. *B60R 13/105* (2013.01); *G09F 7/18* (2013.01); *G09F 2007/1843* (2013.01); *G09F 2007/1865* (2013.01)

(58) Field of Classification Search
CPC . B60R 13/105; G09F 7/18; G09F 2007/1843; G09F 2007/1865
See application file for complete search history.

(56) References Cited

U.S. PATENT DOCUMENTS

| | | | |
|---|---|---|---|
| 9,725,052 B1* | 8/2017 | Honaker | F16B 2/12 |
| 10,518,721 B1 | 12/2019 | Nowakowski et al. | |
| 10,933,820 B1 | 3/2021 | Budraitis et al. | |
| 11,472,351 B2 | 10/2022 | Pham | |
| 2005/0017141 A1* | 1/2005 | Glickman | B60R 13/105 |
| | | | 248/222.11 |

\* cited by examiner

*Primary Examiner* — Cassandra Davis
(74) *Attorney, Agent, or Firm* — PETE ADAMS LAW, PLLC

(57) ABSTRACT

A device for securing a display to a vehicle grill is disclosed, where the device includes a display holder that can hold license plates. The device includes a holder frame having a first end, a first side panel, and a second side panel, where the first end is configured to hold a display. A first hook and second hook are configured to engage a first portion of a front grill of a vehicle. Levers are connected to sliders and a handle bar connects the first lever to the second lever. The hook of the first slider and the hook of the second slider are configured to engage a second portion of the front grill of the vehicle. Together, the lower hooks and upper hooks lock onto the vehicle grill to secure the device with four points of contact in multiple locations.

15 Claims, 8 Drawing Sheets

LICENSE PLATE HOLDER

CROSS-REFERENCE TO RELATED APPLICATIONS

This is a U.S. Nonprovisional Patent Application filed under 35 U.S.C. 111(a).

BACKGROUND OF THE INVENTION

1. Field of the Invention

The present invention relates generally to license plate holders for vehicles, such as automobiles and trucks, and more particularly to a grill mounted front license plate holder.

2. Description of Related Art

Many vehicles are not equipped with license plate mounts on the front of the vehicle. In some states, however, it is required by law to have license plates displayed on both the rear as well as the front of the vehicle. It is common for license plate mounting systems to be attached to the front of vehicles by drilling holes in the bumper or other suitable portion of the body of the vehicle and fastening the mounting system through the holes.

Vehicle owners often do not want to drill holes into the bumper or other portion of the body of their automobiles. Therefore, there is a need for a front license plate holder that allows a license plate to be secured to the body of a vehicle without creating holes or damaging the body of the vehicle. There is a further need for a license plate device that can be attached to the front grill of vehicles. There is also a need for a license plate holder that is easily attached to and released from a vehicle.

SUMMARY OF THE INVENTION

A device for securing a display to a vehicle grill and a method for securing the display are disclosed herein. The device includes a display holder that can hold license plates or other visual displays. The device includes a holder frame having a first end, a first side panel, and a second side panel, where the first end is configured to hold a display. A first hook and second hook are configured to engage a first portion of a front grill of a vehicle. A first guide shaft affixed to the first side panel and a second guide shaft affixed to the second side panel. A first slider is configured to move along the first guide shaft. A second slider is configured to move along the second guide shaft. Levers are operatively connected to the sliders and a handle bar connects the first lever to the second lever. The hook of the first slider and the hook of the second slider are configured to engage a second portion of the front grill of the vehicle. Together, the lower hooks and upper hooks lock onto the vehicle grill to secure the device with four points of contact in multiple locations.

DETAILED DESCRIPTION OF THE INVENTION

The following descriptions relate principally to preferred embodiments while a few alternative embodiments may also be referenced on occasion, although it should be understood that many other alternative embodiments would also fall within the scope of the invention. The embodiments disclosed are not to be construed as describing limits to the invention, whereas the broader scope of the invention should instead be considered with reference to the claims, which may be now appended or may later be added or amended in this or related applications. Unless indicated otherwise, it is to be understood that terms used in these descriptions generally have the same meanings as those that would be understood by persons of ordinary skill in the art. It should also be understood that terms used are generally intended to have the ordinary meanings that would be understood within the context of the related art, and they generally should not be restricted to formal or ideal definitions, unless and only to the extent that a particular context clearly requires otherwise. Synonymous or equivalent terms may be used in different instances in the specification and should not be construed to limit the invention.

For purposes of these descriptions, a few wording simplifications should also be understood as universal, except to the extent otherwise clarified in a particular context either in the specification or in particular claims. The use of the term "or" should be understood as referring to alternatives, although it is generally used to mean "and/or" unless explicitly indicated to refer to alternatives only, or unless the alternatives are inherently mutually exclusive. Furthermore, unless explicitly dictated by the language, the term "and" may be interpreted as "or" in some instances. When referencing values, the term "about" may be used to indicate an approximate value, generally one that could be read as being that value plus or minus half of the value. "A" or "an" and the like may mean one or more, unless clearly indicated otherwise. Such "one or more" meanings are most especially intended when references are made in conjunction with open-ended words such as "having," "comprising" or "including." Likewise, "another" object may mean at least a second object or more. Thus, in the context of this specification, the term "comprising" is used in an inclusive sense and thus should be understood as meaning "including, but not limited to." As used herein, the use of "may" or "may be" indicates that a modified term is appropriate, capable, or suitable for an indicated capacity, function, or usage, while considering that in some circumstances the modified term may sometimes not be appropriate, capable, or suitable. Example quantities and sizing dimensions are described herein but are not limiting, as other sizes and quantities can also be implemented.

Figure 1:
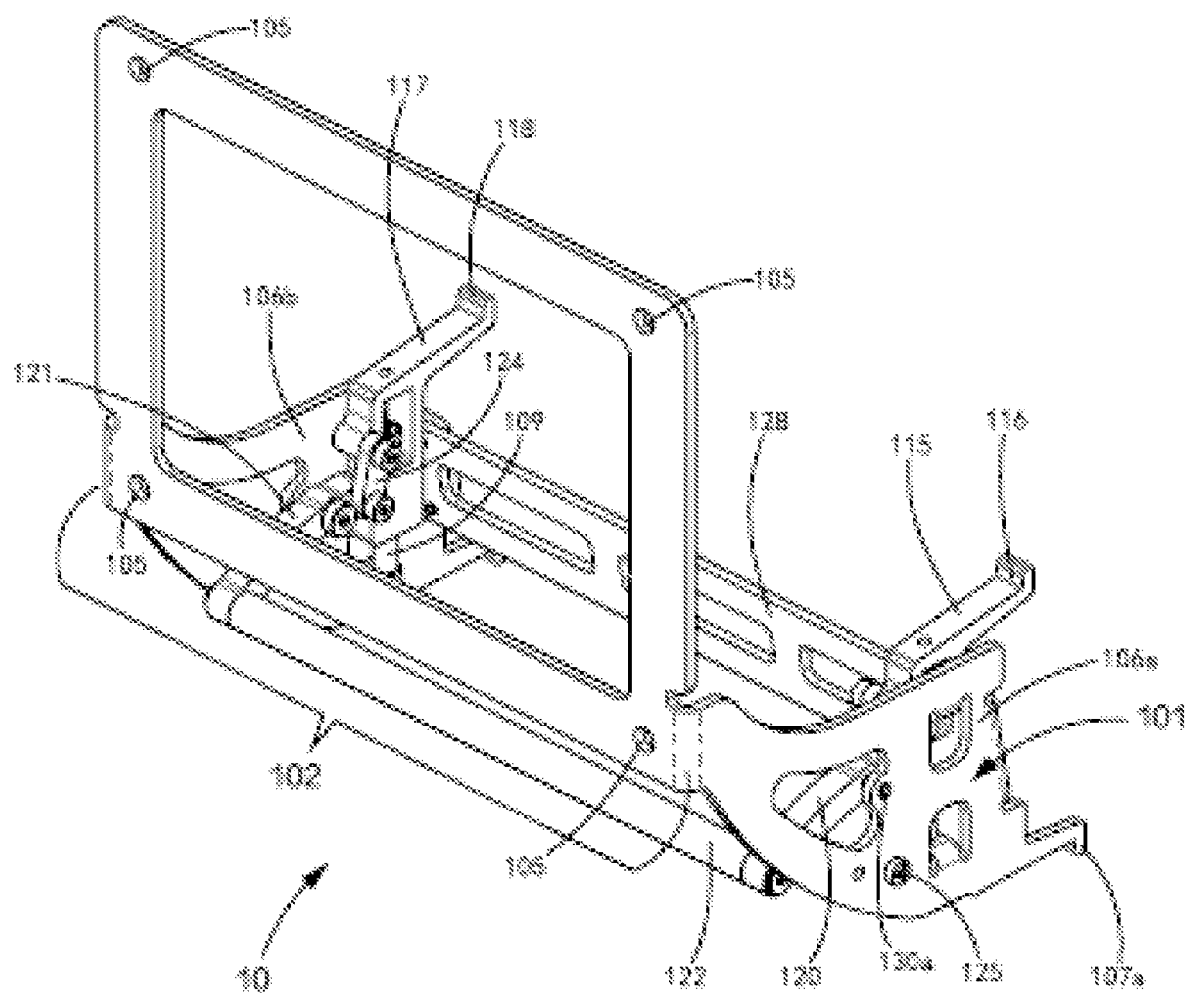
FIG. 1 illustrates a front right perspective view of a display holder device.
Figure 2:
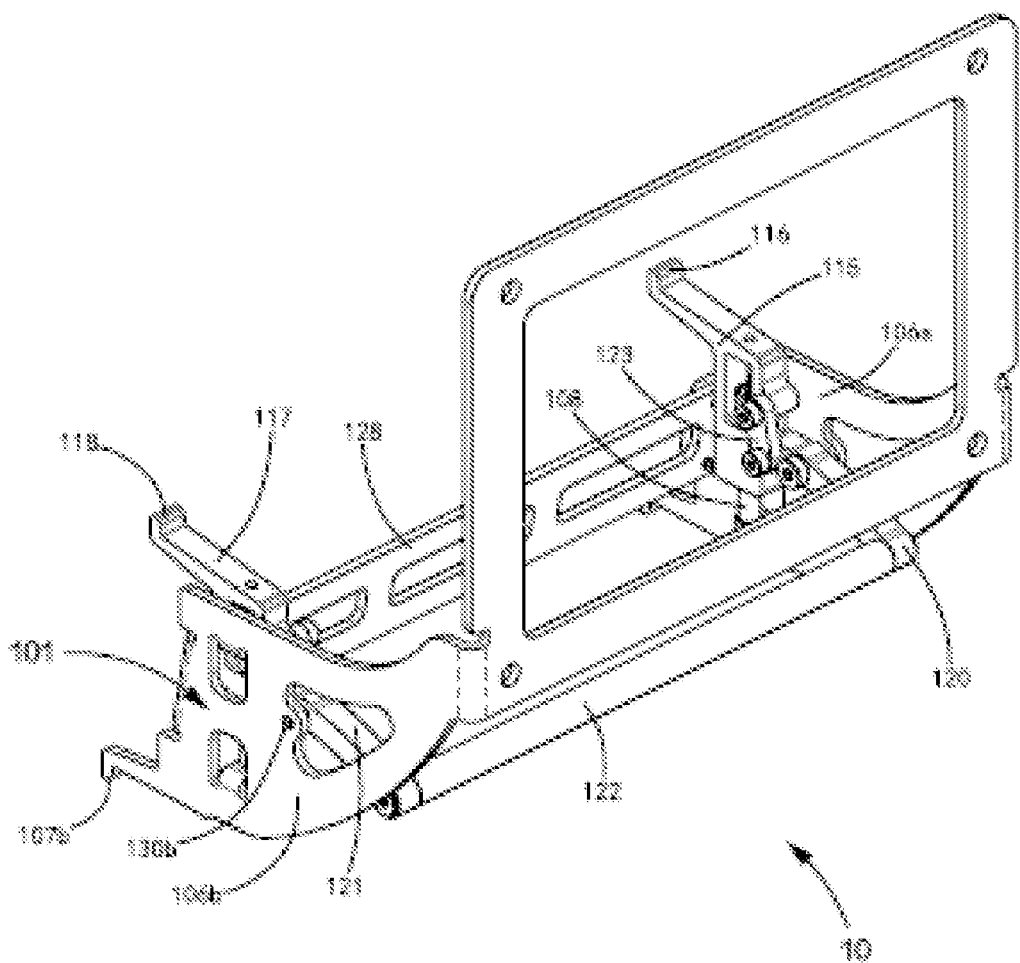
FIG. 2 illustrates a front left perspective view of the display holder device.
Figure 7:
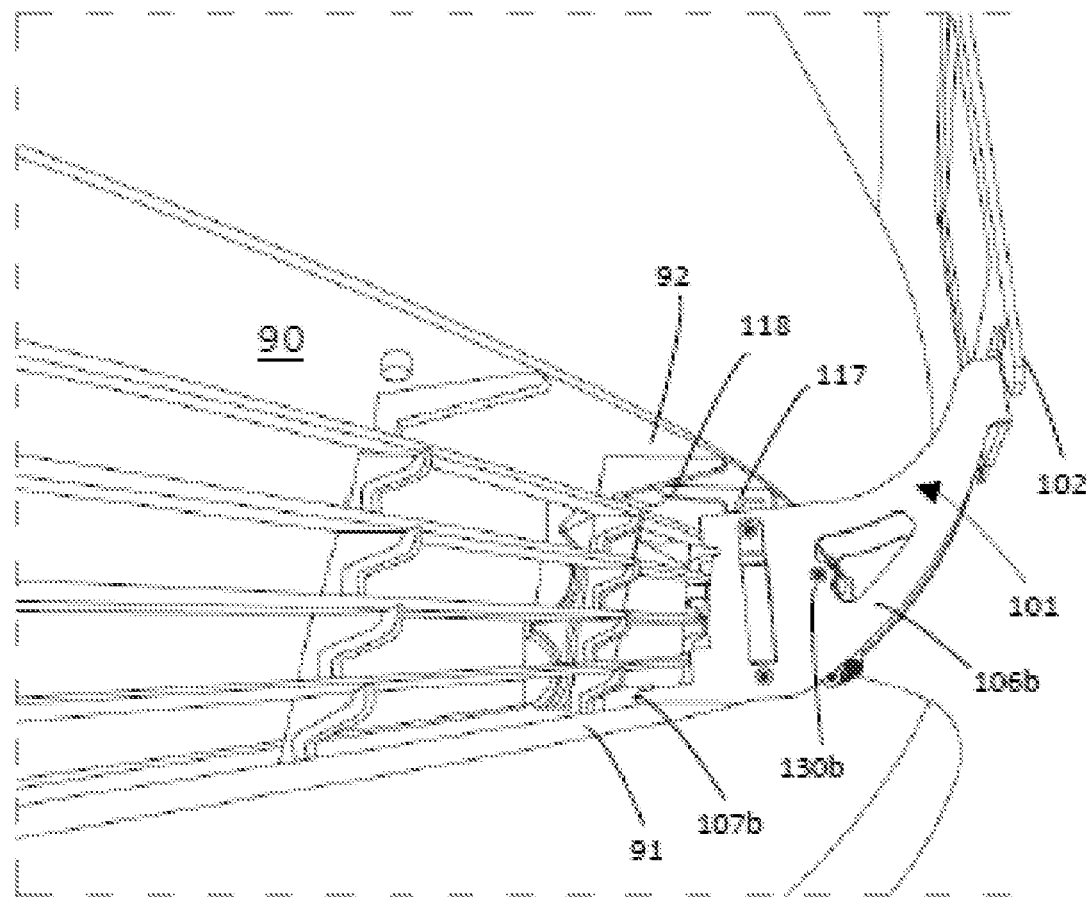
FIG. 7 illustrates a left side perspective view of the holder device mounted to a front grill of a vehicle

FIG. 1 illustrates a front right perspective view of a display holder device 10. FIG. 2 illustrates a front left perspective view of the display holder device 10. The holder device 10 has many duplicate components on opposite sides, which are viewable in FIG. 1 and FIG. 2. The device includes a frame 101 with a first end 102 configured to hold a display. The display is preferably a license plate but can also be an image or verbal message. The display can be secured to the frame 101 using one or more fasteners which are received by mounting holes 105, or using other means such as adhesives. The frame further includes a first side panel 106a and a second side panel 106b. The first side panel 106a includes a first hook 107a and the second side panel 106b includes a second hook 107b. The first hook 107a and second hook 107b can be configured to engage a first portion of a vehicle grill, as illustrated in FIG. 7. In the example embodiment 10, the hooks 107a, 107b are curved and facing downward. In other embodiments, the hooks could be shaped differently to engage a vehicle grill. The hooks 107a, 107b are fixed in place relative to the frame 101.

Figure 5:
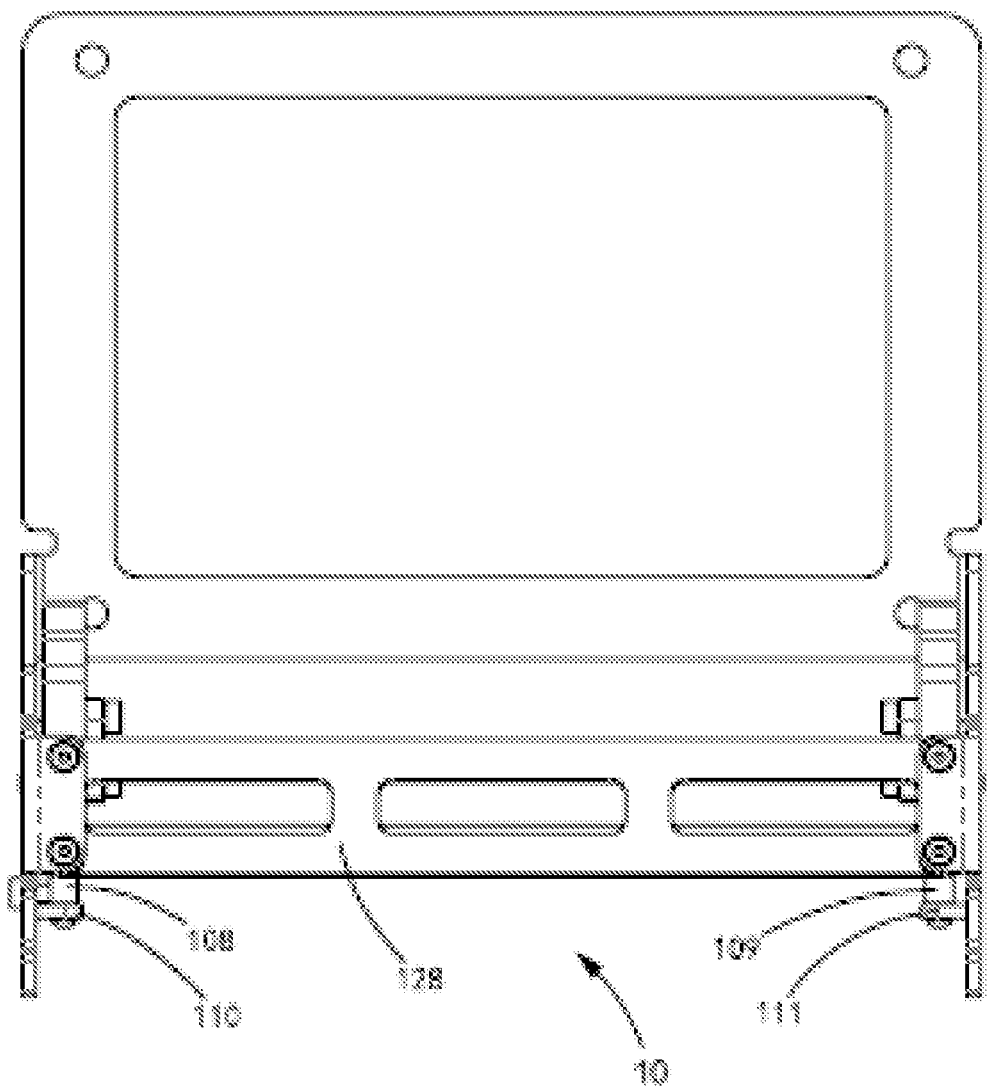
FIG. 5 illustrates a rear view of the display holder device.

The device 10 further includes a first guide shaft 108 and a second guide shaft 109 affixed to the frame 101. As shown, the first guide shaft 108 is affixed to the first side panel 106a and the second guide shaft 109 is affixed to the second side panel 106b. The shafts in this example are cylindrical shaped, but other shapes can be implemented such as rectangular, triangular, etc. The shafts 108, 109 can be affixed to the frame 101 using fasteners or other fittings. For example, the device 10 shown has protrusions 110, 111 with holes sized to fit and secure the shafts 108, 109, as shown in FIG. 5. Further, the device 10 includes a first slider 115 with a hook 116, and a second slider 117 with a hook 118. Each of the sliders are configured to move along the guide shafts. The first slider 115 can move up and down the first guide shaft 108. Likewise, the second slider 117 can move up and down the second guide shaft 109. The sliders 115, 117 are configured to move upward and push against a second portion of the front grill of the vehicle, and the hooks 116, 118 are configured to engage said portion of the vehicle grill. To provide additional structural integrity for the device 10, a back plate 128 can be affixed to the frame 101.

Figure 3:
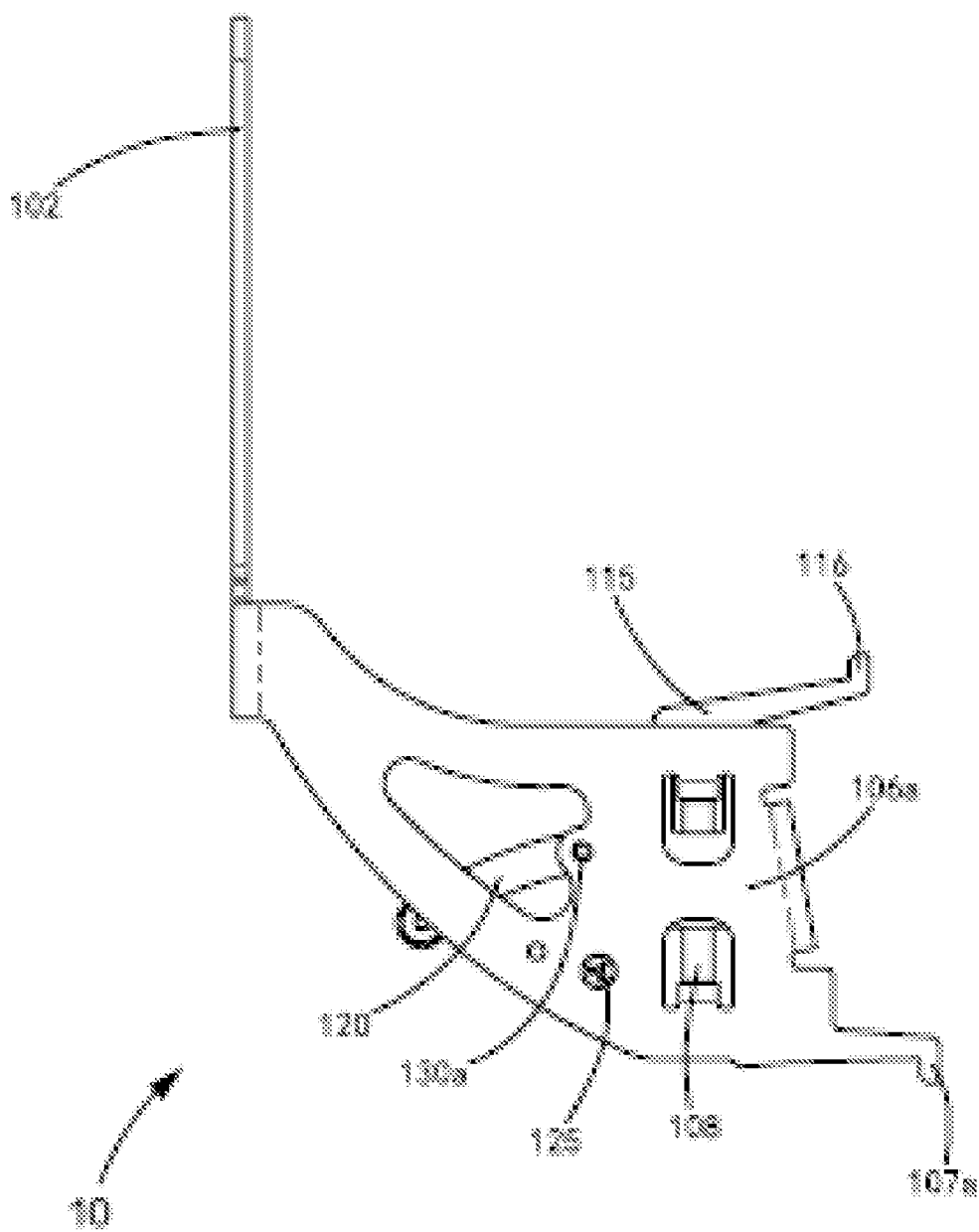
FIG. 3 illustrates a right side view of the display holder device.

FIG. 3 illustrates a right side view of the display holder device 10. FIGS. 4A, 4B, 4C and 4D illustrate left side views of the display holder device 10 in various positions during typical user operation. FIGS. 4A, 4B, 4C and 4D each illustrate the first set of components (slider 115, lever 120, side panel 106a, etc.), while the second set of components (slider 117, lever 121, side panel 106b, etc.) are illustrated as transparent to enable a better view of the interior components. The second set of components are shown in FIGS. 1 and 2.

Figure 4A:
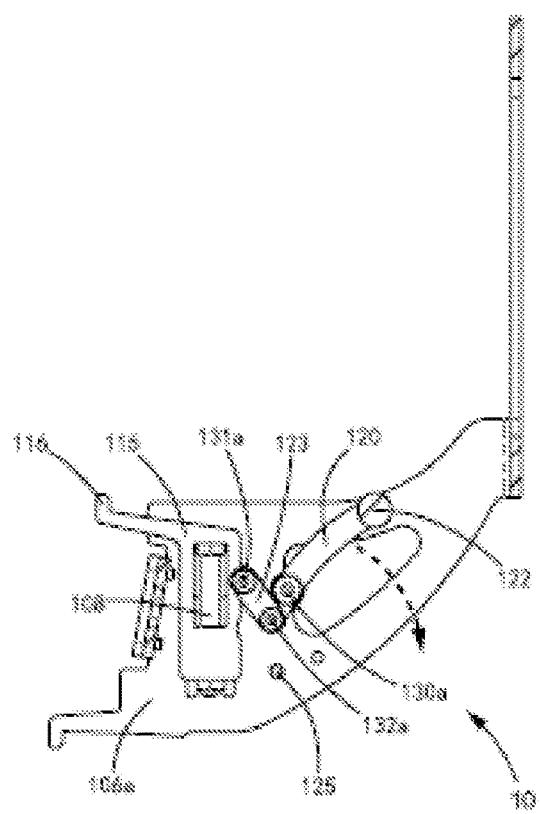
FIGS. 4A, 4B, 4C and 4D illustrate left side views of the display holder device in various positions during typical user operation.

FIG. 4A illustrates a left side view of the holder device 10 with the sliders and hooks at a low starting position. The device 10 can also include a first lever 120 and a second lever 121. The first lever 120 is rotatably connected to the first side panel 106a using fastener 130a or other mechanical connection. The second lever 121 is rotatably connected to the second side panel 106b using fastener 130b or other mechanical connection. The first lever 120 is also operatively connected to the first slider 115, and the second lever 121 operatively connected to the second slider 117. As an example connection system, a first linkage 123 can be rotatably connected to the first slider 115 using fastener 131a at one end, and rotatably connected to the first lever 120 using fastener 132a on the other end. The first slider 115, the first lever 120 and the first linkage 123 can operate together in a locking over center mechanism. Likewise, a second linkage 124 can connect the second slider 117 to the second lever 121, and the second slider 117, the second lever 121 and the second linkage 124 can operate together in a locking over center mechanism. Further, a handle bar 122 can connect to the first lever 120 and second lever 121. In the example shown, the handle bar 122 is substantially perpendicular to the levers 120, 121. The handle bar 122 provides a connection mechanism between both side of the device 10 and causes the levers, linkages and sliders to move in unison.

Figure 4B:
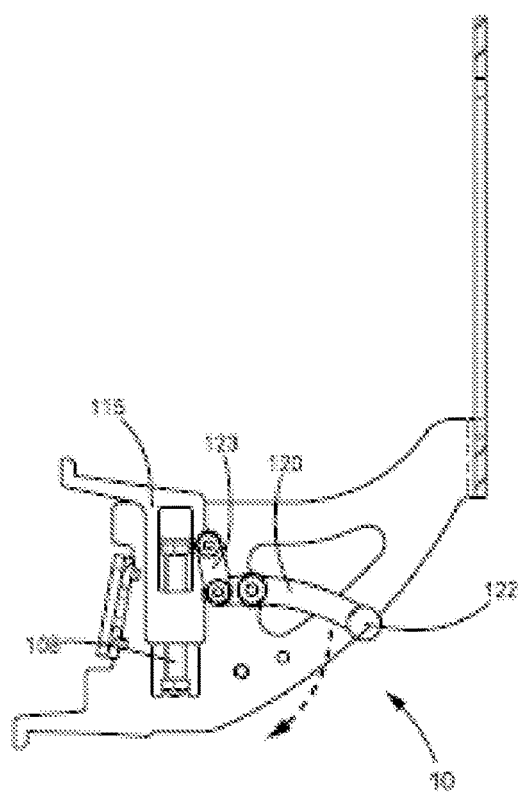

FIG. 4B illustrates a left side view of the holder device 10 with the sliders and hooks at a middle position. As an example method of use, a user can apply force by pushing the handle bar 122 downward, causing the first lever 120 and second lever 121 to rotate. The simultaneous movement of the levers 120, 121 causes the sliders 115, 117 to move upward along the guide shafts 108, 109.

Figure 4C:
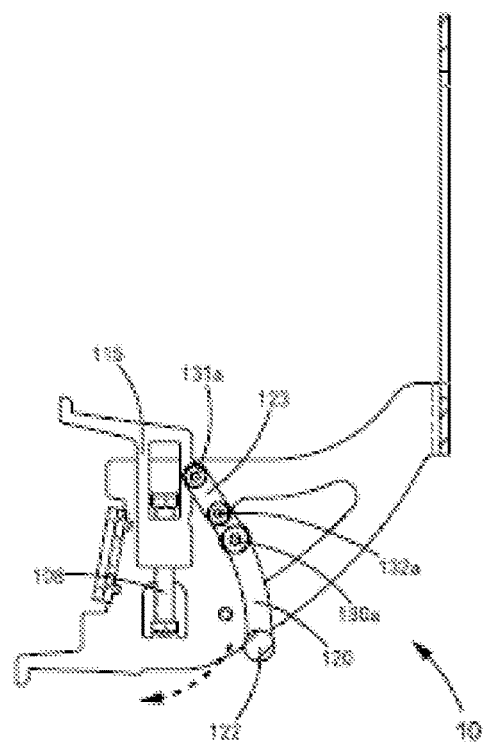

FIG. 4C illustrates a left side view of the holder device 10 with the sliders and hooks at their highest possible position, which is also the center position of the locking over center mechanism comprised of the sliders, levers, and linkages. In this center position, the fasteners 130a, 131a and 132a are positioned in a straight line. Beyond this center position, as a user pushes the handle bar 122 further downward, the sliders 115, 117 begin to move downward along the first guide shaft 108 rather than upward. Coincidentally, any downward force applied to the sliders 115, 117 beyond this center position causes the levers 120, 121 to move downward.

Figure 4D:
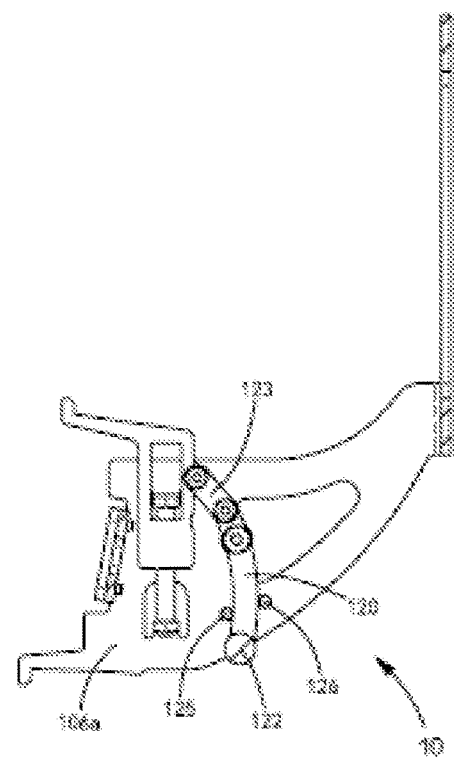

FIG. 4D illustrates a left side view of the holder device 10 with the sliders and hooks at their final position. A hard stop 125 is affixed to the first side panel 106a. The first lever 120 is pressed against the hard stop 125 by any downward force applied on the first slider 115, such as a reactive downward force applied by the second portion of the vehicle grill. The levers 120, 121 can remain secured in this final position unless a user applies an upward lifting force against the handle bar 122. However, the device 10 can also include a removable security pin 126 which can be inserted after the device reaches its final position to physically limit the range of motion of the first lever 120. The hard stop 125 and security pin 126 can be any component that can limit motion such as a screw, bolt, pin, etc. The security pin 126 functions as an additional component to secure the levers in place. The security pin 126 can enable the device 10 to withstand greater shock forces caused by vehicle motion, such as vibrations generated by the vehicle going over bumps in the road, and sudden changes in speed and direction.

Figure 6:
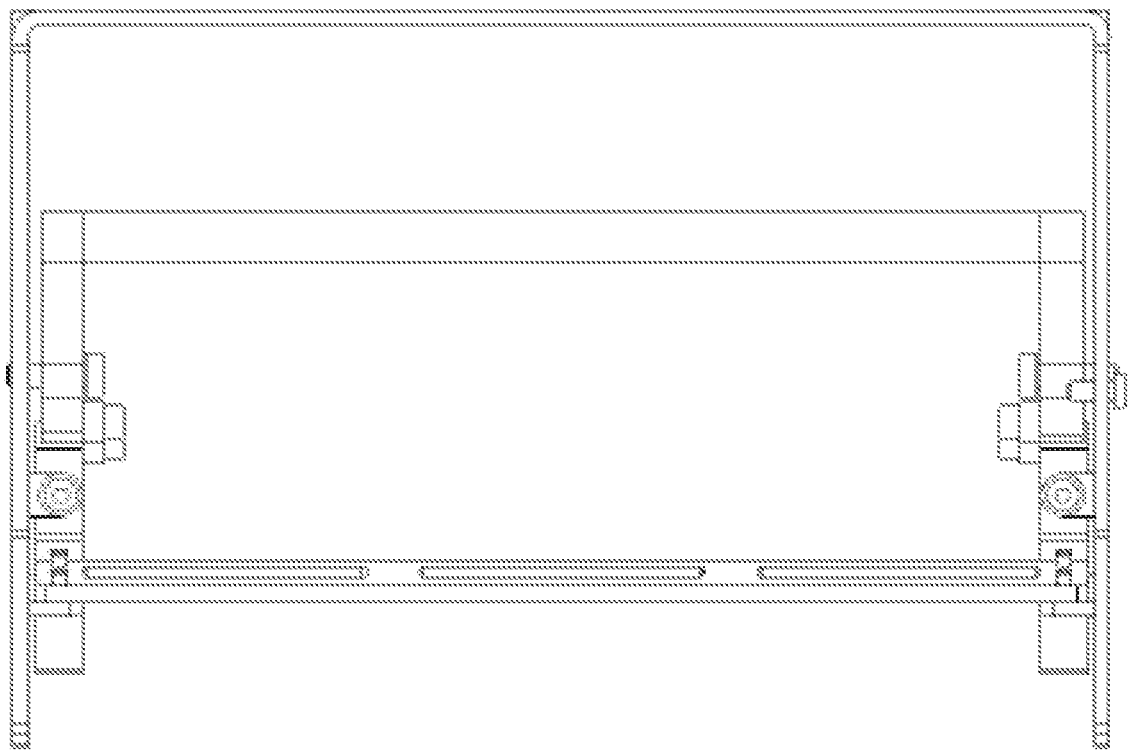
FIG. 6 illustrates a bottom view of the display holder device.

FIG. 5 illustrates a rear view of the display holder device 10. FIG. 6 illustrates a bottom view of the display holder device 10.

FIG. 7 illustrates a left side perspective view of the holder device 10 mounted to a front grill 90 of a vehicle. From this perspective in FIG. 7, only the second side panel 106b and the components corresponding to this second panel 106b are visible. It should be understood that the first side panel 106a and its corresponding components function in a symmetrical manner to the second side panel 106b and its components. The first hook 107a (not visible) and second hook 107b are engaged with a first portion 91 of a vehicle grill 90. The hook 116 of the first slider 115 and the hook 118 of the second slider 117 engage a second portion 92 of the front grill 90 of the vehicle. The upper hooks 116, 118 of the sliders 115, 117 secure an upper part of the device 10 to the grill 90, while the first hook 107a and second hook 107b secure a lower part to the grill 90. Together, the hooks 107a, 107b, 116, 118 lock onto the vehicle grill 90 to secure the device 10 with four points of contact in multiple locations. When secured, the device 10 stays mounted to the grill 90 when the vehicle is in motion. Further, the device 10 can withstand forces caused by vehicle motion, such as bumps in the road and sudden changes in speed.

The invention claimed is:
1. A device for securing a display to a vehicle, the device comprising:
   a) a frame configured to hold a display;
   b) the frame includes a first hook and a second hook;
   c) wherein the first hook and second hook are configured to engage a first portion of a front grill of a vehicle;
   d) a first guide shaft affixed to the frame;
   e) a second guide shaft affixed to the frame;
   f) a first slider with a first end, and a second slider with a first end;
   g) wherein the first slider is configured to move along the first guide shaft;
   h) wherein the second slider is configured to move along the second guide shaft;
   i) a first lever operatively connected to the first slider;
   j) a second lever operatively connected to the second slider;
   k) a handle bar connecting the first lever to the second lever; and
   l) wherein the first end of the first slider and the first end of the second slider are configured to engage a second portion of the front grill of the vehicle.

2. The device of claim 1, further comprising:
   a) a first linkage connecting the first slider to the first lever; and
   b) a second linkage connecting the second slider to the second lever.

3. The device of claim 2, wherein:
   a) the first lever, the first linkage, and the first slider operate together in a locking over center mechanism; and
   b) the second lever, the second linkage, and the second slider operate together in a locking over center mechanism.

4. The device of claim 1, further comprising a hard stop to limit the range of motion of the first and second levers.

5. The device of claim 1, further comprising:
   a) a back plate affixed to the frame;
   b) wherein the back plate provides support to the frame.

6. A device for securing a display to a vehicle, the device comprising:
   a) a frame having a first end, a first side panel, and a second side panel;
   b) the first end is configured to hold a display;
   c) the first side panel includes a first hook, and the second side panel includes a second hook;
   d) wherein the first hook and second hook are configured to engage a first portion of a front grill of a vehicle;
   e) a first guide shaft affixed to the first side panel;
   f) a second guide shaft affixed to the second side panel;
   g) a first slider with a hook, and a second slider with a hook;
   h) wherein the first slider is configured to move along the first guide shaft;
   i) wherein the second slider is configured to move along the second guide shaft;
   j) a first lever operatively connected to the first slider;
   k) a second lever operatively connected to the second slider;
   l) a handle bar connecting the first lever to the second lever; and
   m) wherein the hook of the first slider and the hook of the second slider are configured to engage a second portion of the front grill of the vehicle.

7. The device of claim 6, further comprising:
   c) a first linkage connecting the first slider to the first lever; and
   d) a second linkage connecting the second slider to the second lever.

8. The device of claim 7, wherein:
   c) the first lever, the first linkage, and the first slider operate together in a locking over center mechanism; and
   d) the second lever, the second linkage, and the second slider operate together in a locking over center mechanism.

9. The device of claim 6, further comprising a hard stop to limit the range of motion of the first and second levers.

10. The device of claim 6, further comprising:
    c) a back plate affixed to the frame;
    d) wherein the back plate provides support to the frame.

11. A method of securing a display to a vehicle, the method comprising:
    a) providing a frame having: a first end configured to hold a display, a first hook, and a second hook;
    b) providing a first guide shaft affixed to the frame and a second guide shaft affixed to the frame;
    c) providing a first slider with a hook and a second slider with a hook, wherein the first slider is configured to move along the first guide shaft, and the second slider is configured to move along the second guide shaft;
    d) providing a first lever operatively connected to the first slider;
    e) providing a second lever operatively connected to the second slider;
    f) providing a handle bar that connects the first lever to the second lever;
    g) positioning the first and second hooks of the frame on a first portion of a front grill of a vehicle; and
    h) rotating the handle bar to enable the hook of the first slider and the hook of the second slider to engage a second portion of the front grill of the vehicle.

12. The method of claim 11, further comprising: a) providing a first linkage that connects the first slider to the first lever; b) providing a second linkage that connects the second slider to the second lever.

13. The method of claim 12, wherein:
    a) the first lever and the first linkage operate together in a locking over center mechanism; and
    b) the second lever and the second linkage operate together in a locking over center mechanism.

14. The method of claim 11, further comprising:
    a) limiting the range of motion of the first and second levers using a hard stop.

15. The method of claim 11, further comprising:
    a) providing a back plate affixed to the frame, wherein the back plate provides support to the frame.

* * * * *